US012624821B2

(12) United States Patent
Ye et al.

(10) Patent No.: US 12,624,821 B2
(45) Date of Patent: May 12, 2026

(54) LIGHT-EMITTING MODULE

(71) Applicant: DrLightek Co., Ltd., Tainan City (TW)

(72) Inventors: Zhi-Ting Ye, Miaoli County (TW); Chia-Chun Hu, Tainan City (TW); Po-Hsiang Tsai, Taipei City (TW)

(73) Assignee: DRLIGHTEK CO., LTD., Tainan City (TW)

( * ) Notice: Subject to any disclaimer, the term of this patent is extended or adjusted under 35 U.S.C. 154(b) by 0 days.

(21) Appl. No.: 19/186,673

(22) Filed: Apr. 23, 2025

(65) Prior Publication Data

US 2025/0334252 A1 Oct. 30, 2025

(30) Foreign Application Priority Data

Apr. 25, 2024 (TW) ................................ 113115492

(51) Int. Cl.
*F21V 7/28* (2018.01)
*F21V 11/16* (2006.01)
*F21Y 113/17* (2016.01)
*F21Y 115/10* (2016.01)

(52) U.S. Cl.
CPC ................ *F21V 7/28* (2018.02); *F21V 11/16* (2013.01); *F21Y 2113/17* (2016.08); *F21Y 2115/10* (2016.08)

(58) Field of Classification Search
CPC ........ F21V 7/28; F21V 11/16; F21Y 2113/17; F21Y 2115/10
See application file for complete search history.

(56) References Cited

U.S. PATENT DOCUMENTS

| | | | | |
|---|---|---|---|---|
| 8,118,457 B2 * | 2/2012 | Kanai | F21V 7/0091 362/338 | |
| 10,739,507 B2 * | 8/2020 | Imada | G02B 6/002 | |
| 11,048,460 B2 * | 6/2021 | Kim | H10K 59/879 | |
| 11,054,694 B2 * | 7/2021 | Park | G02B 19/0028 | |
| 11,655,960 B2 * | 5/2023 | Han | G02F 1/133606 362/308 | |
| 12,034,103 B2 * | 7/2024 | Hsieh | H10H 20/851 | |
| 2006/0208269 A1 * | 9/2006 | Kim | H10H 20/853 257/E33.059 | |
| 2011/0069496 A1 * | 3/2011 | Ing | F21K 9/00 362/311.03 | |
| 2015/0300594 A1 * | 10/2015 | Lee | G02B 19/0061 362/311.01 | |
| 2017/0160591 A1 * | 6/2017 | Cho | G02F 1/133606 | |
| 2019/0346612 A1 * | 11/2019 | Herlin | F21S 43/247 | |

* cited by examiner

*Primary Examiner* — Tsion Tumebo
(74) *Attorney, Agent, or Firm* — WPAT, PC

(57) ABSTRACT

The present application provides a light-emitting module, which comprises a light-emitting element and a packaging layer disposed on a substrate, the packaging layer including first and second inclined surfaces disposed on an outer side of the packaging layer from bottom to top, an upper surface of the packaging layer recessed downward corresponding to the light-emitting element, and an optical layer disposed on the upper surface of the packaging layer and extended along the upper surface of the packaging layer to form at least one first reflective surface, wherein the first angle of the first inclined surface is different from the second angle of the second inclined surface, and the at least one first reflective surface is disposed at a third angle.

14 Claims, 21 Drawing Sheets

LIGHT-EMITTING MODULE

FIELD OF THE INVENTION

The present application relates to a light-emitting module, and more particularly to a light-emitting module with uniform light emission.

BACKGROUND OF THE INVENTION

A light-emitting diode (LED) is a semiconductor element that generates light by using a p-n junction structure of a semiconductor structure. The generated light is generated by the recombination of minority carriers (electrons or holes) injected into the semiconductor. In the past technologies, LEDs could only emit red and green light, which limited their use to display elements.

However, with the development of technology, LEDs may emit light in a variety of wavelength ranges in addition to red and green light. This makes it be possible to use LEDs in a variety of different fields. In particular, when white light emission is achieved, the fields of applications of LEDs are expanded to include lighting elements and backlights for liquid crystal displays.

This technological advancement has led to LEDs of a variety of colors, which not only provide a wider range of choices, but also change the standards of many industries. LEDs are now widely used in a variety of fields, including home lighting, commercial lighting, automotive lighting, and display technology and so on. LEDs provide high efficiency, durability, and energy-saving characteristics to make LEDs be one of the mainstreams in today's lighting and display technologies.

In the applications of displays, indirect lighting, and advertising boards, LEDs are arranged to form a surface light source, which is used as a backlight.

However, in the conventional surface light source, the light generated by a single LED chip is usually emitted upward more than outward, and when the LED chips are combined into an array, a plurality of bright and dark areas are generated, resulting in uneven light distribution.

Continued with the above, the uneven light distribution has a negative impact on the display effect or the lighting effect. If the upward emitted light is not properly controlled, the LED array cannot be applied to the case having a requirement of a uniform surface light source. Therefore, in order to overcome the aforementioned problems, the industry needs a structure that may efficiently homogenize the light emitted by a single LED.

In view of the above problems of the conventional technology, the present application provides a light-emitting module, which adjusts the distribution of a central light by a reflective surface of a packaging layer and an optical layer and adjusts the distribution of peripheral light by an inclined surface around the packaging layer, so that the light-emitting module has a homogeneous light distribution.

SUMMARY

An objective according to the present application is to provide a light-emitting module, which includes a packaging layer covering a light-emitting element, an upper surface of the packaging layer has a reflective surface recessed downward, an outer side of the packaging layer includes two inclined surfaces, and an optical layer filled on the upper surface of the packaging layer. The reflective surface and the optical layer adjust the distribution of central lights, and the two inclined surfaces adjust the distribution of peripheral lights, so that the light-emitting module has a homogeneous light distribution and further improves the uniformity of the light source.

In order to overcoming aforementioned problem and achieving aforementioned objective, the present application provides a light-emitting module, which comprises a substrate, a light-emitting element, a packaging layer, and an optical layer. The light-emitting element is disposed on the substrate. The packaging layer is also disposed on the substrate, and covers the light-emitting element. An outer side of the packaging layer includes a first inclined surface and a second inclined surface from bottom to top. the first inclined surface is extended upward to form the second inclined surface while an upper portion of the first inclined surface is connected with a bottom portion of the second inclined surface. An upper surface of the packaging layer is recessed downwardly corresponding to the light-emitting element. The optical layer is disposed on the upper surface of the packaging layer and extended along the upper surface of the packaging layer to form at least one first reflective surface. A first angle of the first inclined surface is different from a second angle of the second inclined surface. The at least one first reflective surface is disposed at a third angle. Thereby, this structure of the present application provides a light-emitting module with a homogeneous light distribution.

In an embodiment of the present application, wherein a bottom of the substrate includes two electrodes electrically connected to the light-emitting element.

In an embodiment of the application, wherein the light emitting element emits a first light, the first light is emitted to the first inclined surface and the second inclined surface, the first inclined surface and the second inclined surface refract the first light respectively, the light emitting element emits a second light, the second light is emitted to the at least one first reflective surface, a part of the second light passes through the at least one first reflective surface, the at least one first reflective surface reflects another part of the second light, the first inclined surface and the second inclined surface refract the second light respectively.

In an embodiment of the application, wherein the light emitting element is buried in an inside of the substrate.

In an embodiment of the application, wherein the first reflective surface is recessed downward corresponding to the light emitting element to form a recessed portion, a depth of the recessed portion is larger than a width of the recessed portion.

In an embodiment of the application, wherein the top of the substrate includes a reflecting layer, including a plurality of reflecting structures.

In an embodiment of the application, wherein the reflecting structures are holes or black and white ink particles respectively.

In an embodiment of the application, wherein the top of the substrate includes a shielding layer, which covers an outer side of the light emitting element.

In an embodiment of the application, wherein the packaging layer includes a plurality of the first reflective surfaces, which are adjacent to each other.

In an embodiment of the application, both sides of the at least one first reflective surface extend to form at least one second reflective surface and at least one third reflective surface, the third angle of the at least one first reflective surface is larger than a fourth angle of the at least one second reflective surface, the fourth angle is larger than a fifth angle of the at least one third reflective surface.

In an embodiment of the application, wherein the packaging layer includes a plurality of the at least one first reflective surface, the at least one second reflective surface and the at least one third reflective surface, and the third reflective surfaces, adjacent to each other.

In an embodiment of the application, the upper side of the optical layer further comprises a diffusion sheet, and the density of the diffusion dots is gradually reduced corresponding to the light emitting element.

In an embodiment of the application, further comprising an optical glue, covering an outer side of the packaging layer.

In an embodiment of the application, wherein the optical glue includes a spacing groove, the spacing groove corresponds to a region having lower density of the diffusion dots.

In an embodiment of the application, wherein the optical glue extends upwardly to cover the optical layer, and the upper surface of the optical glue includes a plurality of microstructures.

DETAILED DESCRIPTION

To provide the reviewers with a further understanding and recognition of the features and effects achieved by the present application, detailed explanations and examples are provided as follows:

In view of the above problems of the prior art, the present application is a light-emitting module, including a light-emitting element and a packaging layer disposed on a substrate, an outer side of the packaging layer including a first inclined surface and a second inclined surface from bottom to top, an upper surface of the packaging layer recessed downward corresponding to the light-emitting element, and at least one first reflective surface is formed by extending the upper surface from the outer side to the light-emitting element, and an optical layer is disposed on the upper surface of the packaging layer, the central light emission of the light-emitting element is homogenized by the at least one first reflective surface and the optical layer, and the peripheral light emission of the light-emitting element is adjusted by the first inclined surface and the second inclined surface, thereby solving the problem of uneven light emission of the light-emitting module of the prior art.

Figure 1:
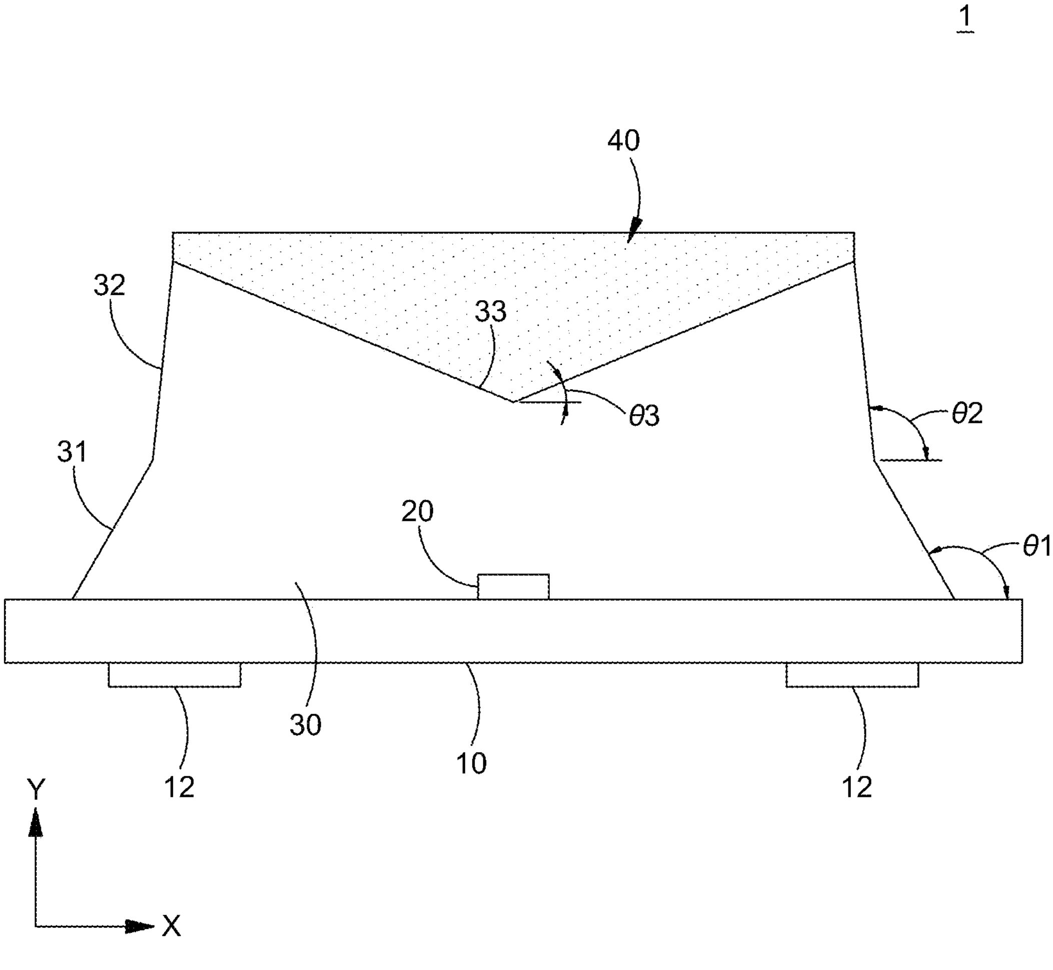
FIG. 1 is a schematic diagram of a structure according to a first embodiment of the present application.

Referring to FIG. 1, which is a schematic diagram of a structure according to a first embodiment of the present application, as shown in the figure, the present embodiment is the first embodiment, which is a light-emitting module 1, which comprises a substrate 10, a light-emitting element 20, a packaging layer 30, and an optical layer 40; in the present embodiment, the optical layer 40 is a material capable of semi-transmitting light and semi-reflecting light.

Referring to FIG. 1 again, as shown in the figure, in the present embodiment, the light-emitting element 20 is disposed on the substrate 10, the packaging layer 30 is also disposed on the substrate 10, and the packaging layer 30 covers the light-emitting element 20 to package the light-emitting element 20 on the substrate 10. The packaging layer 30 includes a first inclined surface 31 and a second inclined surface 32, first inclined surface 31 are surrounded an outer side of the packaging layer 30, and the first inclined surface 31 is extended upward to form the second inclined surface 32, so that the first inclined surface 31 and the second inclined surface 32 form a continuous surface by connecting with a bottom side of the second inclined surface 32 and an upper side of the first inclined surface 31, and the upper surface of the packaging layer 30 is recessed downward corresponding to the light-emitting element 20, and extending from outside to the light-emitting element 20 to form at least one first reflective surface 33. The optical layer 40 is disposed on the upper surface of the packaging layer 30, and the optical layer 40 fills the recessed area of the packaging layer 30.

Continued with the above, the first inclined surface 31 has a first angle θ1 with the X-axis (as shown in the figure), the second inclined surface 32 has a second angle θ2 with the X-axis, and the at least one first reflective surface 33 has a third angle θ3 with the X-axis (towards the packaging layer 30). The first angle θ1 of the first inclined surface 31 is different from the second angle θ2 of the second inclined surface 32, for example, the first angle θ1 is greater than the second angle θ2 of the second inclined surface 32, that is, θ1>θ2. The third angle θ3 of the at least one first reflective surface 33 is preferably acute, but is not limited thereto.

Figure 2:
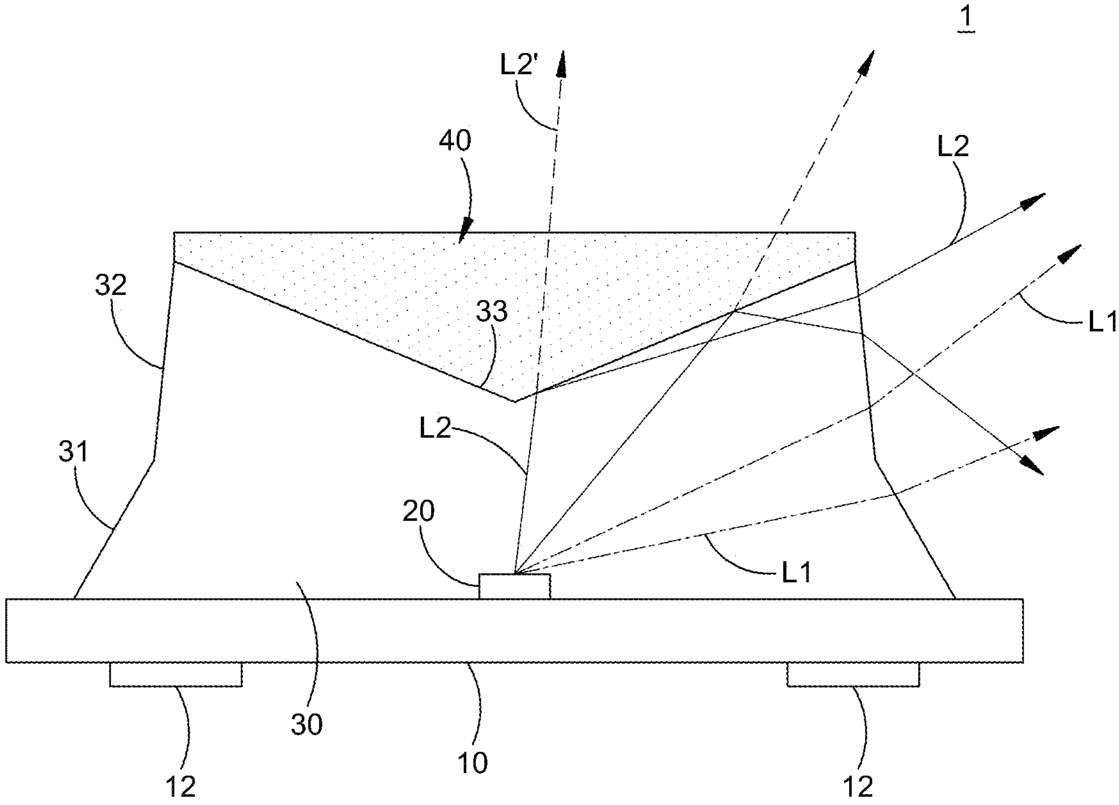
FIG. 2 is a schematic diagram of a light path according to the first embodiment of the present application.

Referring to FIG. 2, which is a schematic diagram of a light path according to a first embodiment of the present application, as shown in the figure, in this embodiment, the first inclined surface 31 and the second inclined surface 32 are used to adjust the light emitted by the light emitting element 20 towards a side of the light emitting element 20, and the optical layer 40 is filled to control the upward light of the light emitting element 20, the bottom side of the optical layer 40 is extended along the upper surface of the packaging layer 30 to form the at least one first reflective surface 33 with gradually increasing slopes. When the light emitting element 20 emits a first light L1 (shown as a dotted line in the figure), the first light L1 is emitted to the first inclined surface 31 and the second inclined surface 32, and the first inclined surface 31 and the second inclined surface 32 refract the first light L1 respectively.

Continued with the above, when the light emitting element 20 emits a second light L2 (shown as a solid line in the figure), the second light L2 is emitted to the at least one first reflective surface 33, a part of the second light L2 passes through the at least one first reflective surface 33, that is, the second light L2' (shown as a dotted line in the figure), and the at least one first reflective surface 33 reflects another part of the second light L2 respectively. The other part of the second light L2 is emitted to the first inclined surface 31 and the second inclined surface 32, so that the first inclined surface 31 and the second inclined surface 32 refract the second light L2 (shown as a solid line in the figure) respectively. In this way, the second light L2 in the center of the light emitting element 20 is weakened by half transmission and half reflection, and is reflected to the periphery of the packaging layer 30 and emitted, so that the light emitted by the light emitting module 1 is homogenized.

Continued with the above, in this embodiment, the light emitting element 20 is a light emitting diode (LED), but is not limited thereto.

Continued with the above, in the embodiment, the packaging layer 30 is a light-transmitting member capable of transmitting light.

Continued with the above, in the embodiment, the first reflective surface 33 is a mirror reflective surface or a diffuse reflective surface.

Continued with the above, in the embodiment, the optical layer 40 is selected from a material that partially transmits and partially reflects light, for example, adding nano-particles to reflect part of the light and transmit another part of the light.

Continued with the above, in an embodiment, a bottom side of the substrate 10 includes two electrodes 12 electrically connected to the light-emitting element 20, so that the light-emitting module 1 may be directly applied, but the embodiment is not limited thereto.

Figure 3:
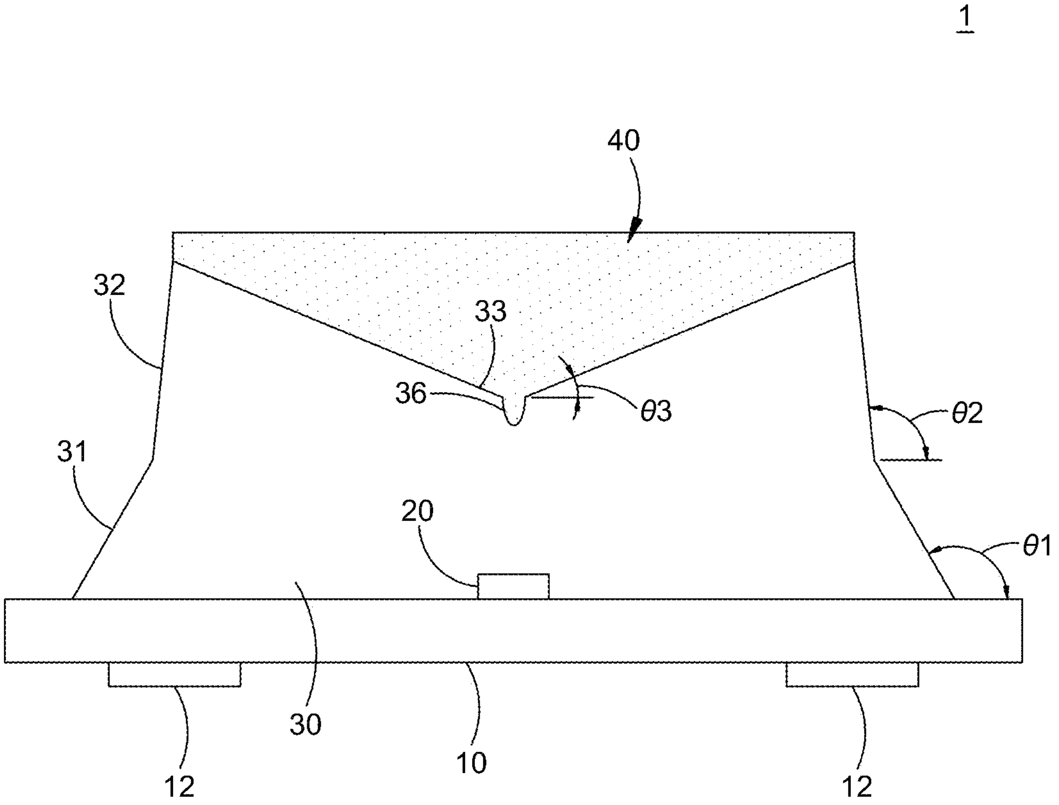
FIG. 3 is a schematic diagram of a structure according to a second embodiment of the present application.
Figure 4:
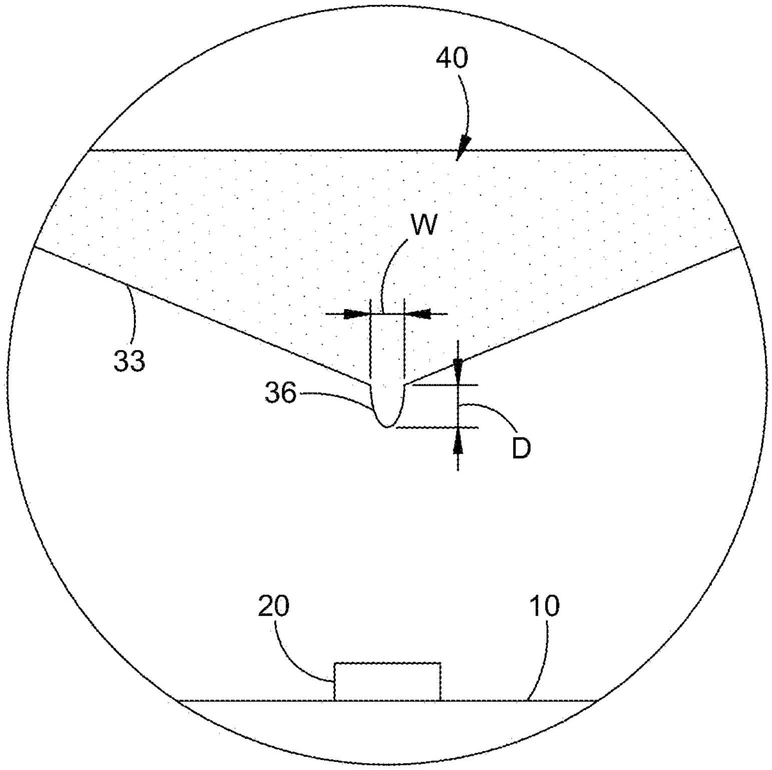
FIG. 4 is a schematic diagram of a structure in an enlarged view according to the second embodiment of the present application.

Referring to FIG. 3 and FIG. 4, FIG. 3 is a schematic diagram of a structure according to a second embodiment of the application, and FIG. 4 a schematic diagram of a structure in an enlarged view according to the second embodiment of the present application. As shown in the figures, the present embodiment is the second embodiment, which is based on the first embodiment. In the embodiment, a recessed portion 36 is recessed downwardly on the first reflective surface 33 corresponding to the light-emitting element 20. The recessed portion 36 has a depth D in a direction toward the light-emitting element 20, and a width W of an aperture size of the recessed portion 36. The depth D is greater than the width W, that is, D>W.

Continued with the above, the recessed portion 36 is disposed corresponding to the position of the light-emitting element 20, so that the light diffusion degree of the lowermost end of the first reflective surface 33 is improved, and the tolerance allowance during manufacturing is improved.

The optical layer 40 also fills the space formed by the recessed portion 36. When the second light L2 is emitted to the recessed portion 36, a part of the second light L2 is transmitted, and another part of the second light L2 is reflected. The other elements of the embodiment are the same as the elements of the first embodiment, and thus are not described herein.

Figure 5:
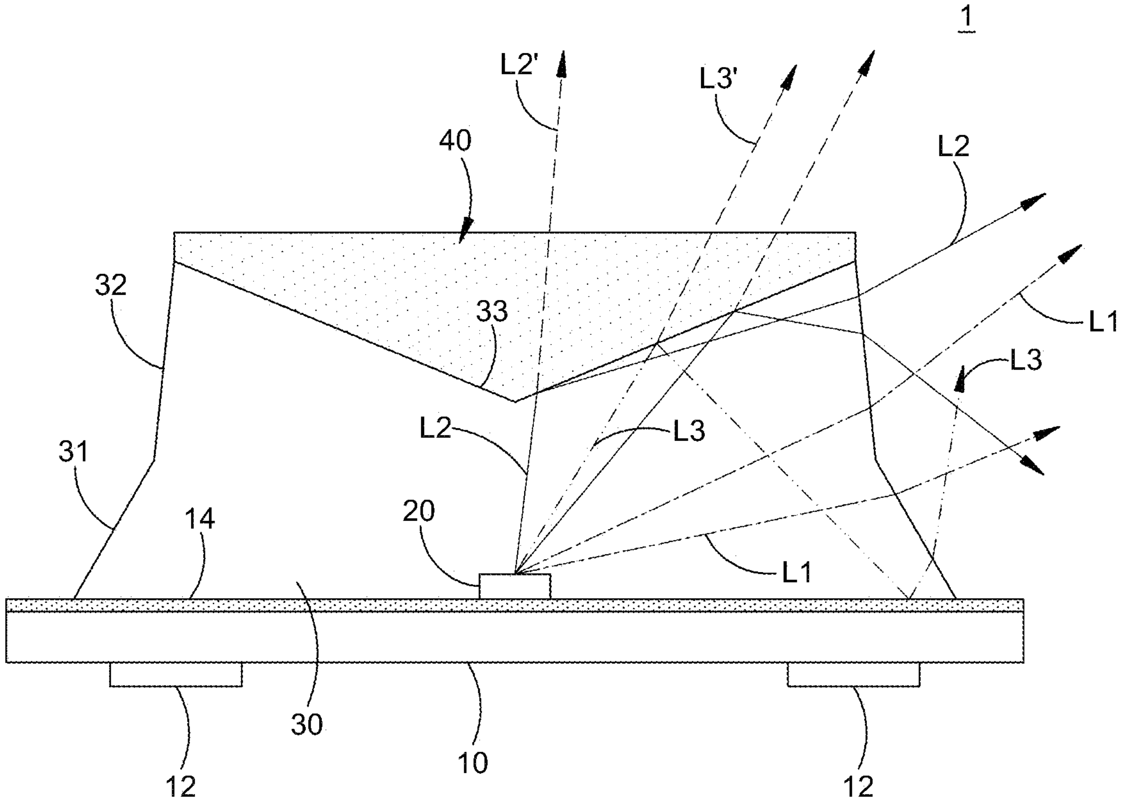
FIG. 5 is a schematic diagram of a structure and light path according to a third embodiment of the present application.

Referring to FIG. 5, which is a schematic diagram of a structure and a light path according to a third embodiment of the present application. As shown in the figure, the present embodiment is a third embodiment, which is based on the first embodiment. In the present embodiment, a reflective layer 14 is disposed on the substrate 10. The reflective layer 14 includes a plurality of reflective structures 142. The reflective layer 14 reflects the first light L1 or the second light L2. For example, the light emitting element 20 emits a third light L3 to the first inclined surface 31. A part of the third light L3 penetrates the first inclined surface 31 to form a third light L3'. Another part of the third light L3 is reflected by the reflective layer 14 to the first inclined surface 31 by using the reflective structures 142. The other elements of the present embodiment are the same as the elements of the first embodiment, and thus are not described herein.

Continued with the above, in an embodiment, the reflective structures 142 are respectively a hole or a black and white ink particle, such as a microporous layer or a mixed structure of black light-absorbing ink and white reflective solder mask ink. The black ink particles absorb light, the white ink particles reflect light, and the quantity ratio of the black ink particles and the white ink particles is adjusted to control the brightness of the reflected light. The present embodiment is not limited thereto.

Figure 6:
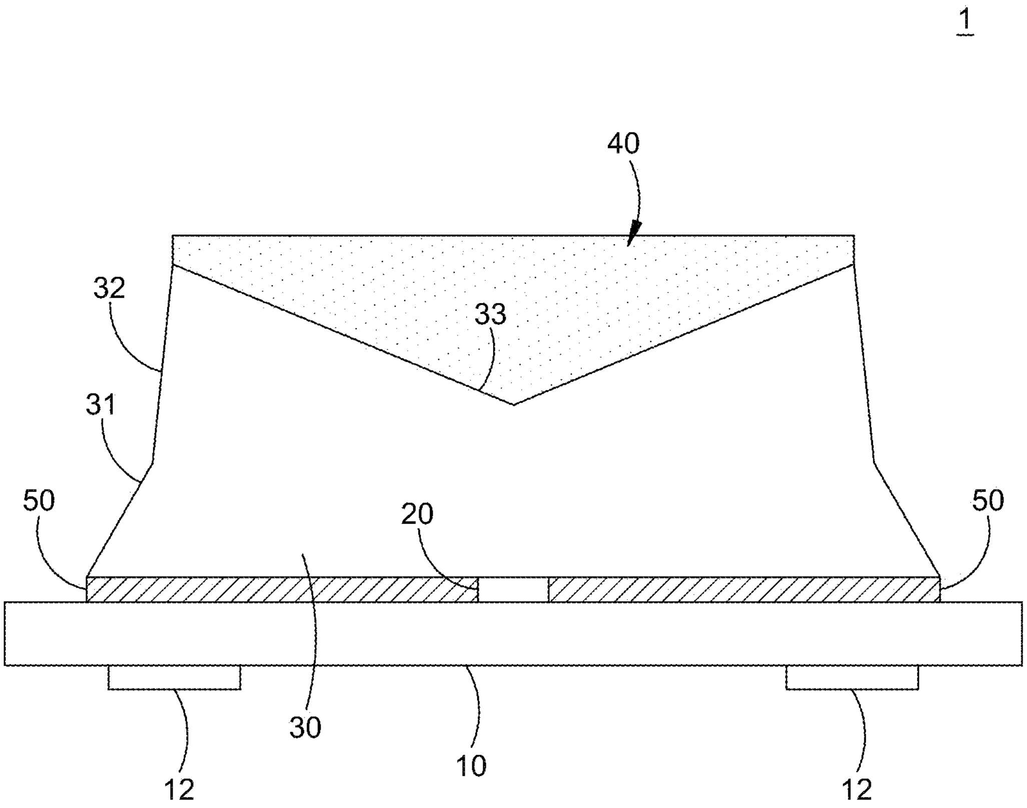
FIG. 6 is a schematic diagram of a structure according to a fourth embodiment of the present application.

Please refer to FIG. 6, which is a schematic diagram of a structure according to a fourth embodiment of the present application. As shown in the figure, the present embodiment is a fourth embodiment, which is based on the first embodiment. In the present embodiment, a shielding layer 50 is disposed on the substrate 10. The shielding layer 50 is disposed an outer side the light emitting element 20 and covers the light emitting element 20. The shielding layer 50 is used to prevent the leakage light from irradiating to the external substrate or another light emitting module 1, thereby preventing the substrate from being degraded or mixed light. The other elements of the present embodiment are the same as the elements of the first embodiment, and thus are not described herein.

Continued with the above, in an embodiment, the shielding layer 50 is made of an opaque material.

Figure 7:
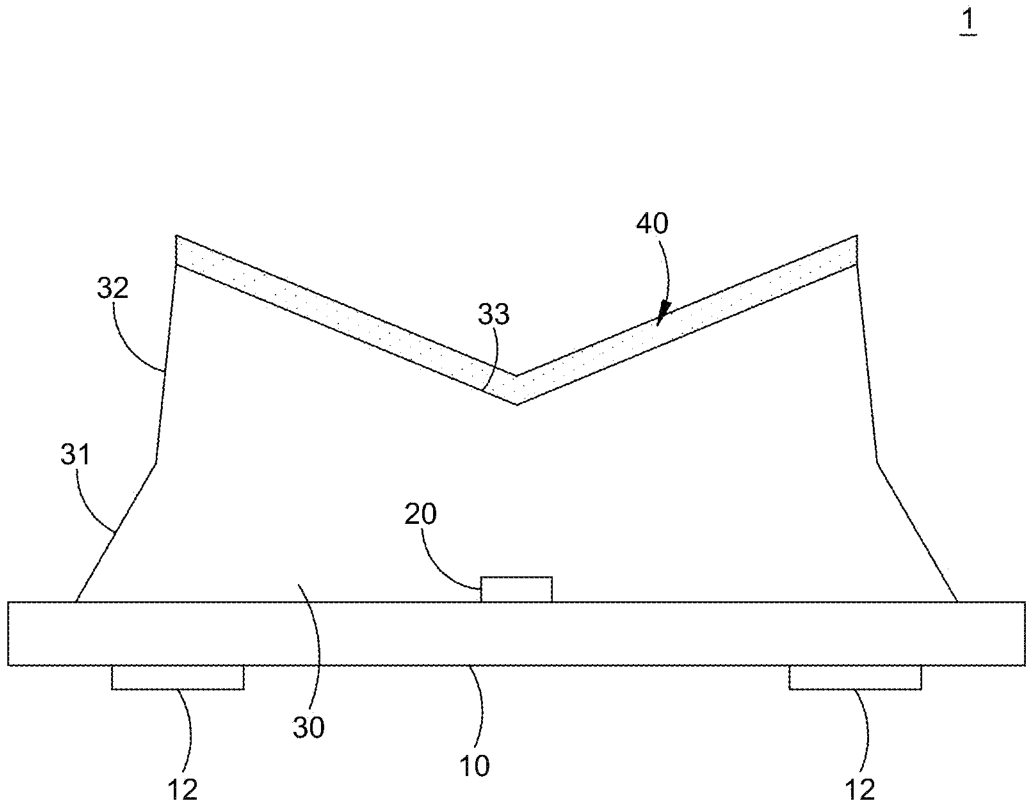
FIG. 7 is a schematic diagram of a structure according to a fifth embodiment of the present application.

Please refer to FIG. 7, which is a schematic diagram of a structure according to a fifth embodiment of the present application. As shown in the figure, the present embodiment is a fifth embodiment, which is based on the first embodiment. In the present embodiment, the optical layer 40 is disposed on the upper surface of the packaging layer 30 with a uniform thickness.

Continued with the above, in an embodiment, the optical layer 40 is added to the recessed portion of the upper surface of the packaging layer 30, the packaging layer 30 is rotated to distribute the optical layer 40 on the at least one first reflective surface 33 (or the recessed portion 36), and the optical layer 40 is hardened by light to form the structure shown in FIG. 7. However, the embodiment is not limited thereto, and the rotation of the packaging layer 30 may be further adjusted to form a structure with a thicker center and a thinner outer side. The other elements of the embodiment are the same as those of the first embodiment, and thus are not described herein.

Figure 8:
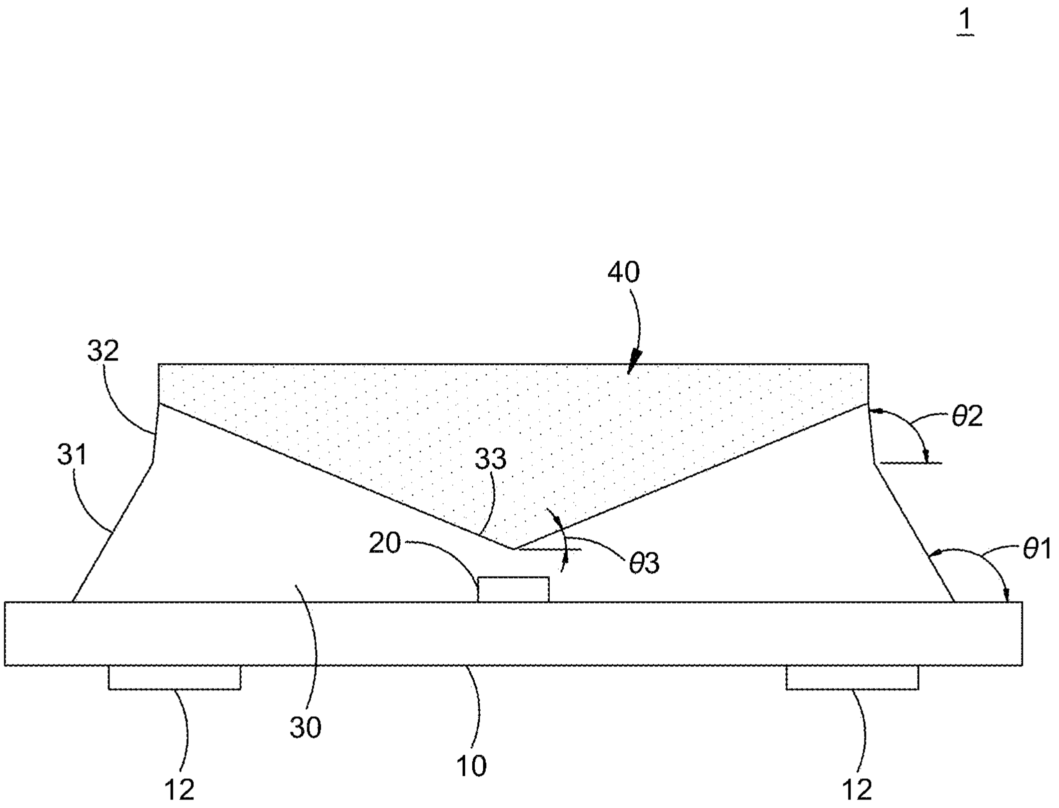
FIG. 8 is a schematic diagram of a structure according to a sixth embodiment of the present application.

Referring to FIG. 8, which is a schematic diagram of a structure according to a sixth embodiment of the application, the sixth embodiment is based on the first embodiment. In the sixth embodiment, the lowermost end of the at least one first reflective surface 33 is disposed on the light emitting element 20 to control the light distribution. The other elements of the sixth embodiment are the same as the elements of the first embodiment, and thus are not described herein.

Figure 9:
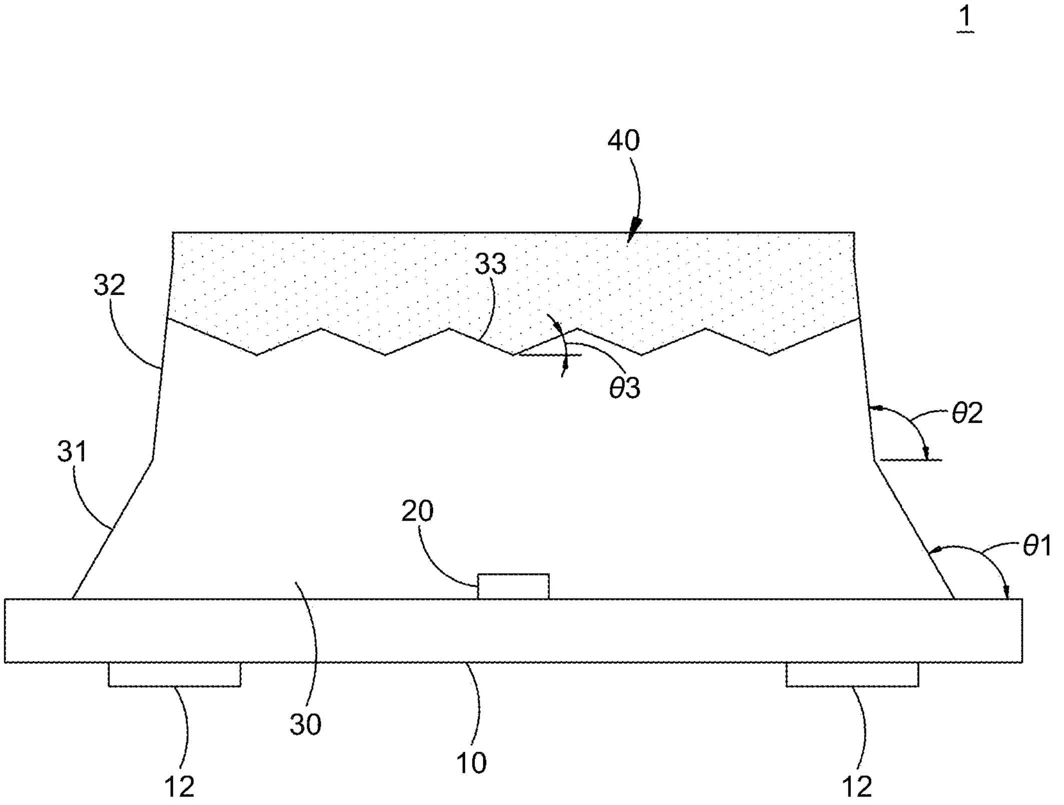
FIG. 9 is a schematic diagram of a structure according to a seventh embodiment of the present application.

Referring to FIG. 9, which is a schematic diagram of a structure according to a seventh embodiment of the application, the seventh embodiment is based on the first embodiment. In the seventh embodiment, the packaging layer 30 includes a plurality of the first reflective surfaces 33, and the first reflective surfaces 33 are arranged to form an optical structure layer to control the light distribution. The other elements of the seventh embodiment are the same as those of the first embodiment, and thus are not described herein.

Figure 10:
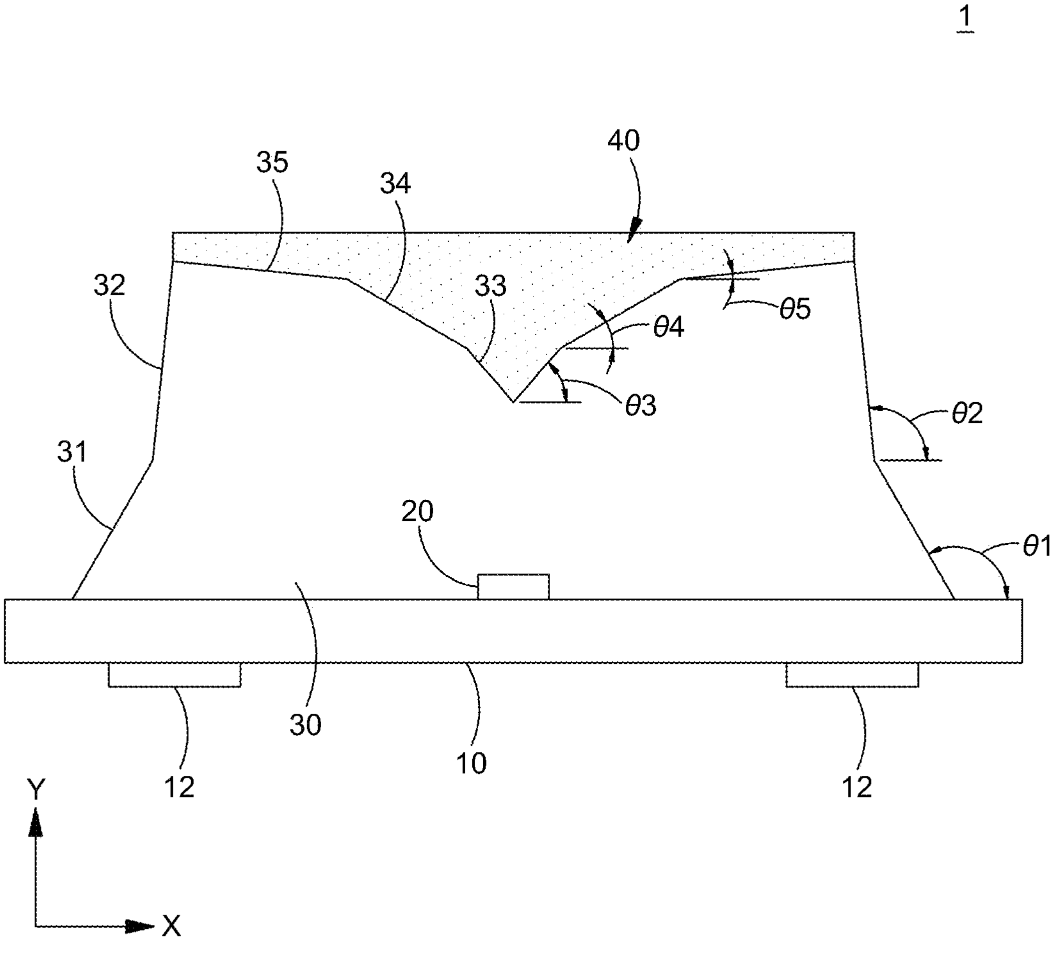
FIG. 10 is a schematic diagram of a structure according to an eighth embodiment of the present application.

Referring to FIG. 10, which is a schematic diagram of a structure according to an eighth embodiment of the application, the eighth embodiment is based on the first embodiment. In the eighth embodiment, the upper surface of the packaging layer 30 is recessed downward corresponding to the light emitting element 20, and sequentially extends from the outer side of the packaging layer 30 to the light emitting element 20 to form the at least one first reflective surface 33, the at least one second reflective surface 34, and the at least one third reflective surface 35.

Continued with the above, the at least one first reflective surface 33 has a third angle θ3 with the X-axis (towards the packaging layer 30), the at least one second reflective surface 34 has a fourth angle θ4 with the X-axis (towards the packaging layer 30), and the at least one third reflective surface 35 has a fifth angle θ5 with the X-axis (towards the packaging layer 30), wherein the third angle θ3 of the at least one first reflective surface 33 is greater than the fourth angle θ4 of the at least one second reflective surface 34, and the fourth angle θ4 is greater than the fifth angle θ5 of the at least one third reflective surface 35, i.e. $\theta 3 > \theta 4 > \theta 5$.

Continued with the above, in the embodiment, the second reflective surface 34 and the third reflective surface 35 are mirror reflective surfaces or diffuse reflective surfaces.

Figure 11:
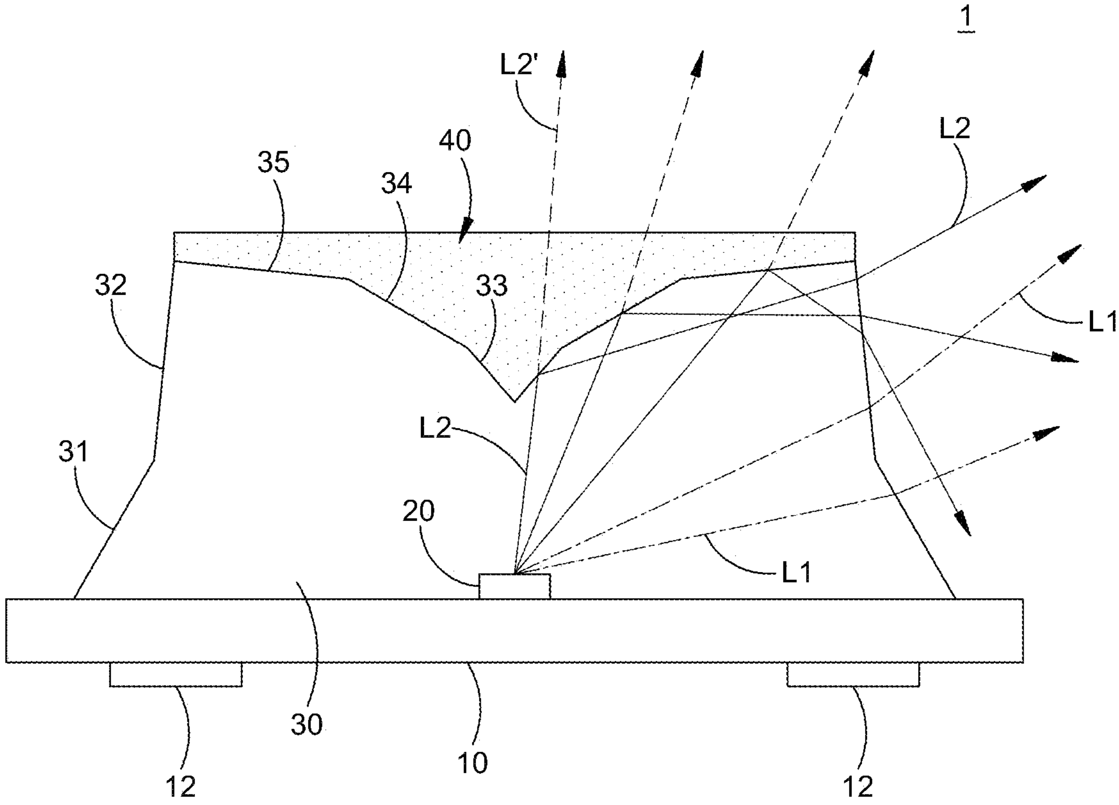
FIG. 11 is a schematic diagram of a light path according to the eighth embodiment of the present application.

Referring to FIG. 11, which is a schematic diagram of a light path according to an eighth embodiment of the present application. As shown in FIG. 11, in the eighth embodiment, when the light emitting element 20 emits a second light L2 (solid line in the figure), the second light L2 is emitted to the at least one first reflective surface 33, the at least one second reflective surface 34, and the at least one third reflective surface 35. A part of the second light L2 passes through the at least one first reflective surface 33, the at least one second reflective surface 34, and the at least one third reflective surface 35, which is the second light L2' (dashed line in the figure). Meanwhile, the at least one first reflective surface 33, the at least one second reflective surface 34, and the at least one third reflective surface 35 respectively reflect another part of the second light L2. The other part of the second light L2 is emitted from the first inclined surface 31 and the second inclined surface 32, so that the first inclined surface 31 and the second inclined surface 32 respectively refract the second light L2 (show as a solid line in the figure). In this way, the second light L2 in the center of the light emitting element 20 is weakened by the semi-transmission and semi-reflection mode and is reflected to be emitted from the periphery of the packaging layer 30, so that the light emitting module 1 is uniformized in light emission. The other elements of the eighth embodiment are the same as the elements of the first embodiment, and thus are not described herein.

Figure 12:
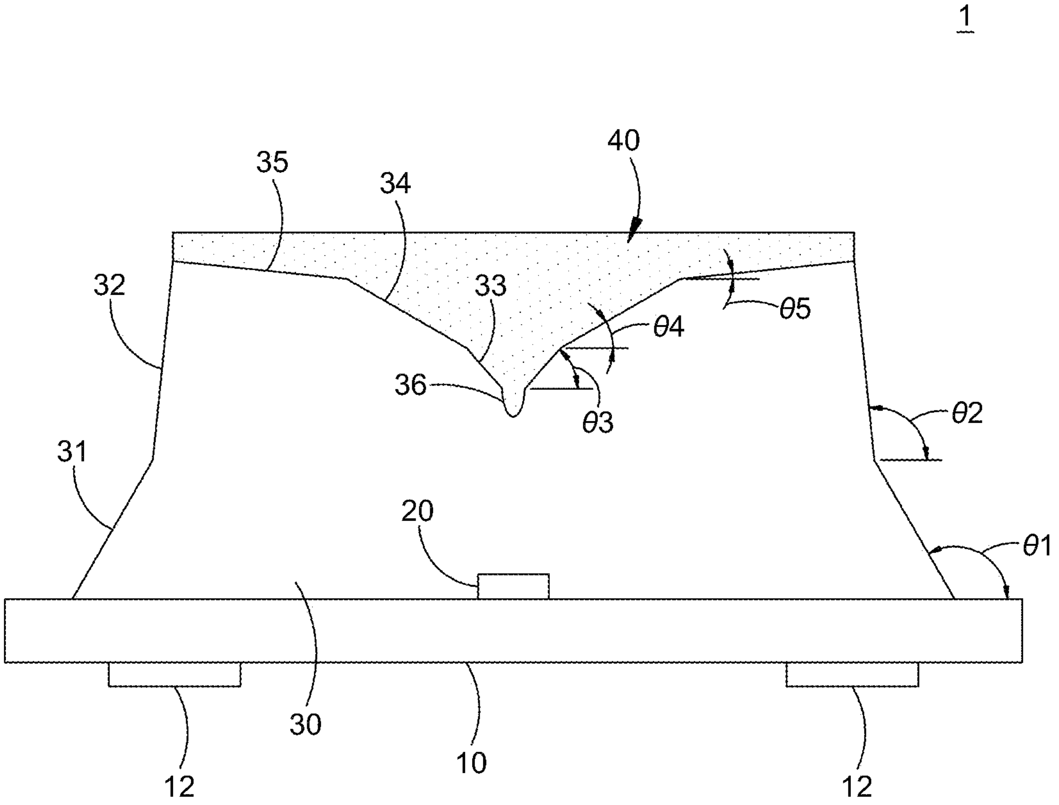
FIG. 12 is a schematic diagram of a structure according to a ninth embodiment of the present application.

Referring to FIG. 12, which is a schematic diagram of a structure according to a ninth embodiment of the present application. As shown in FIG. 12, the ninth embodiment is based on the eighth embodiment and the second embodiment. As in the second embodiment, in the ninth embodiment, a recessed portion 36 is recessed downward from the at least one first reflective surface 33 corresponding to the light emitting element 20. The recessed portion 36 has a depth D in the direction toward the light emitting element 20, and has a width W in the hole size. The depth D is greater than the width W, that is, D>W. Other elements of the ninth embodiment are the same as the elements of the eighth embodiment, and thus are not described herein.

Figure 13:
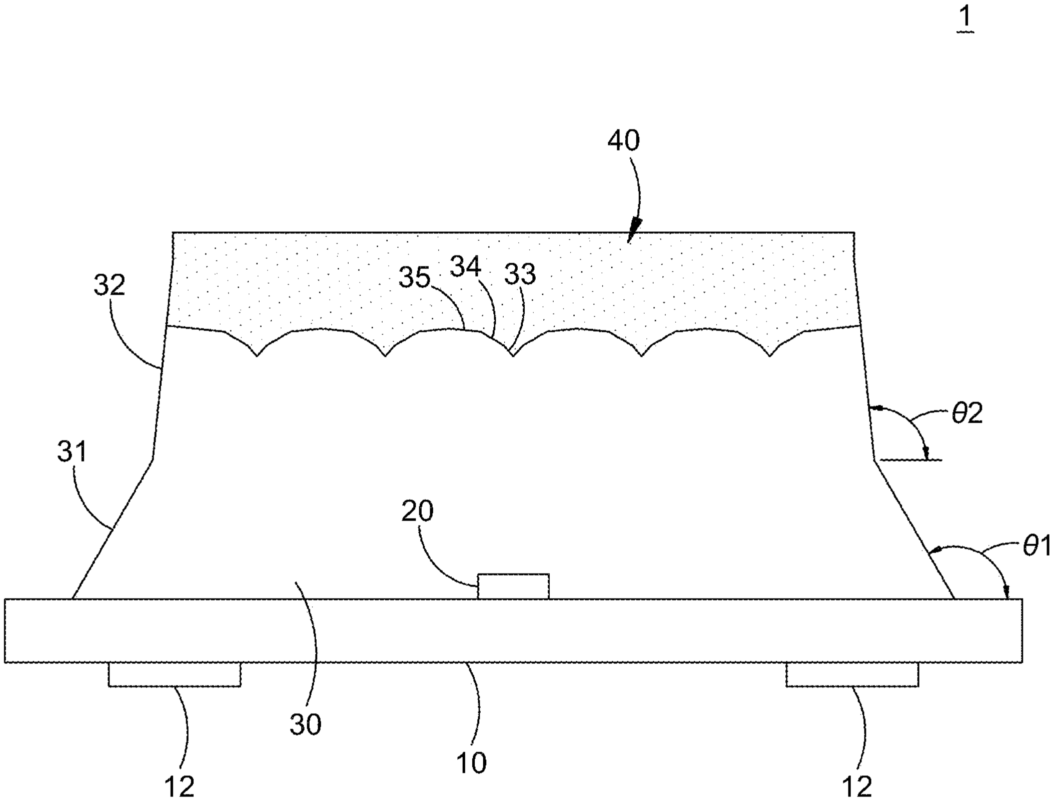
FIG. 13 is a schematic diagram of a structure according to a tenth embodiment of the present application.

Referring to FIG. 13, which is a schematic diagram of a structure according to a tenth embodiment of the application. The tenth embodiment is based on the eighth and seventh embodiments. As in the seventh embodiment, the packaging layer 30 includes a plurality of the at least one first reflective surface 33, the at least one second reflective surface 34, and the at least one third reflective surface 35, and the third reflective surfaces 35 are adjacently arranged to form an optical structure layer for controlling the light distribution of the light emitted from the light-emitting element 20. The elements of the tenth embodiment are the same as the elements of the eighth embodiment, and thus are not described herein.

Figure 14:
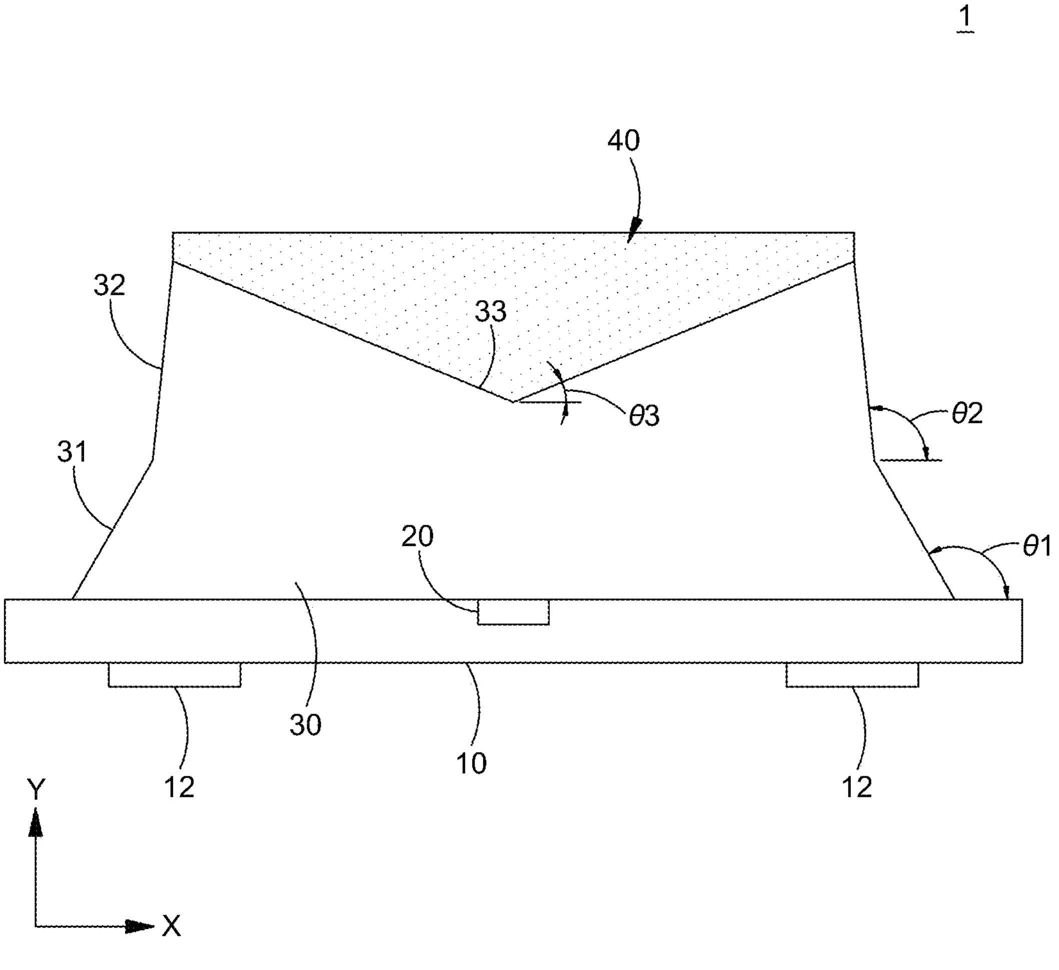
FIG. 14 is a schematic diagram of a light emitting element according to an embodiment of the present application.

Referring to FIG. 14, which is a schematic diagram of a light-emitting element structure according to an embodiment of the application. The embodiment is based on the first to tenth embodiments. The embodiment may be applied to the first to tenth embodiments. In the embodiment, the light-emitting element 20 is embedded in the substrate 10 to prevent light leakage of the light-emitting element 20 (as exemplified by the first embodiment). The other elements of the embodiment are the same as the elements of the first to tenth embodiments, and thus are not described herein.

Figure 15:
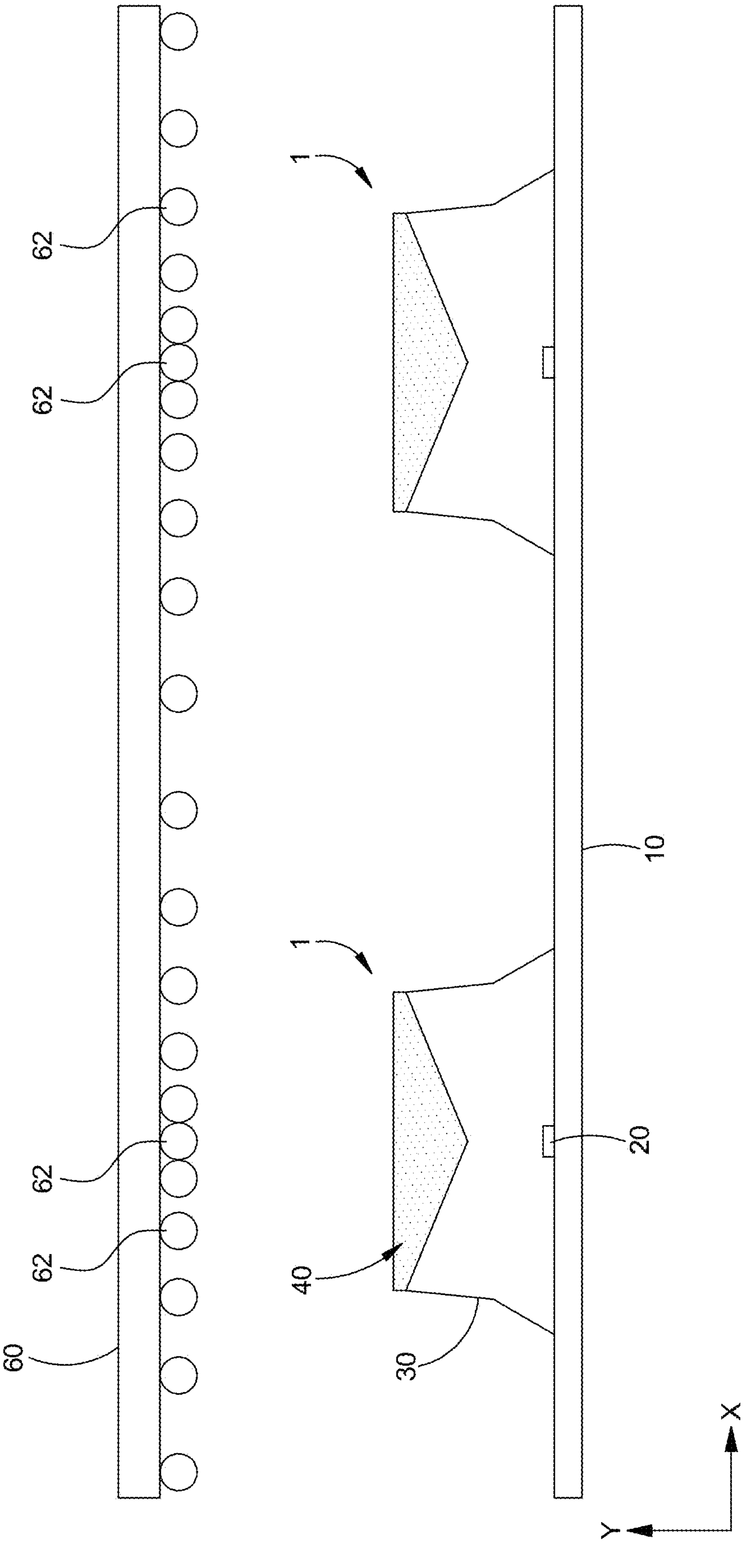
FIG. 15 is a schematic diagram of a diffusion sheet according to an embodiment of the present application.

Referring to FIG. 15, which is a schematic diagram of a diffusion sheet structure according to an embodiment of the application. The embodiment further comprises a diffusion sheet 60, which is disposed on the optical layer 40. A plurality of diffusion dots 62 are arranged below the diffusion sheet 60. The density of the diffusion dots 62 gradually decreases from the light-emitting element 20, that is, the density of the diffusion dots 62 on the light-emitting element 20 is the highest, and the density of the diffusion dots 62 gradually decreases outward.

Continued with the above, in an embodiment, the diffusion dots 62 may also have a gradually decreasing size from the light-emitting element 20.

Figure 16A:
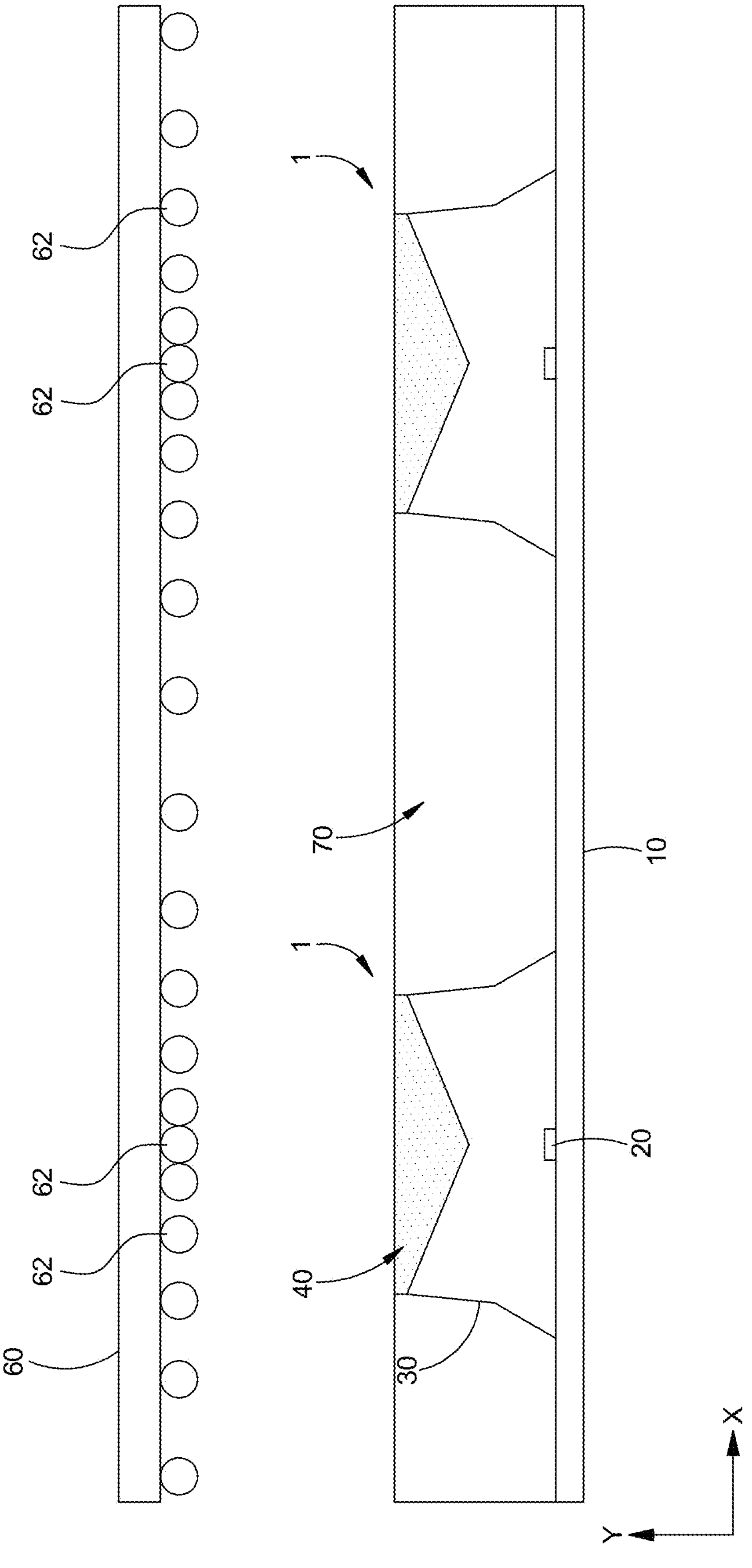
FIGS. 16A to 16D are schematic diagrams of an optical glue according to an embodiment of the present application.

Referring to FIGS. 16A to 16D, schematic diagrams of an optical adhesive structure according to an embodiment of the application are shown. The embodiment is based on the first to tenth embodiments. The embodiment further comprises an optical glue 70, which is coated on the outside of the packaging layer 30. As shown in FIG. 16A, the light-emitting module 1 and another light-emitting module 1 are filled with the optical glue 70.

Continued with the above, in the embodiment, the refractive index of the optical glue 70 is different from that of the packaging layer 30.

Referring to FIGS. 16A-16D, in the embodiment, the optical glue 70 includes a spacing groove P1 corresponding to the regions with low density of the diffusion dots 62. The spacing groove P1 may reflect the light of the light-emitting module 1 by using the difference in refractive index between the optical glue 70 and air, inert gas, or vacuum, thereby avoiding interference between the light-emitting module 1 and another light-emitting module 1.

Figure 16B:
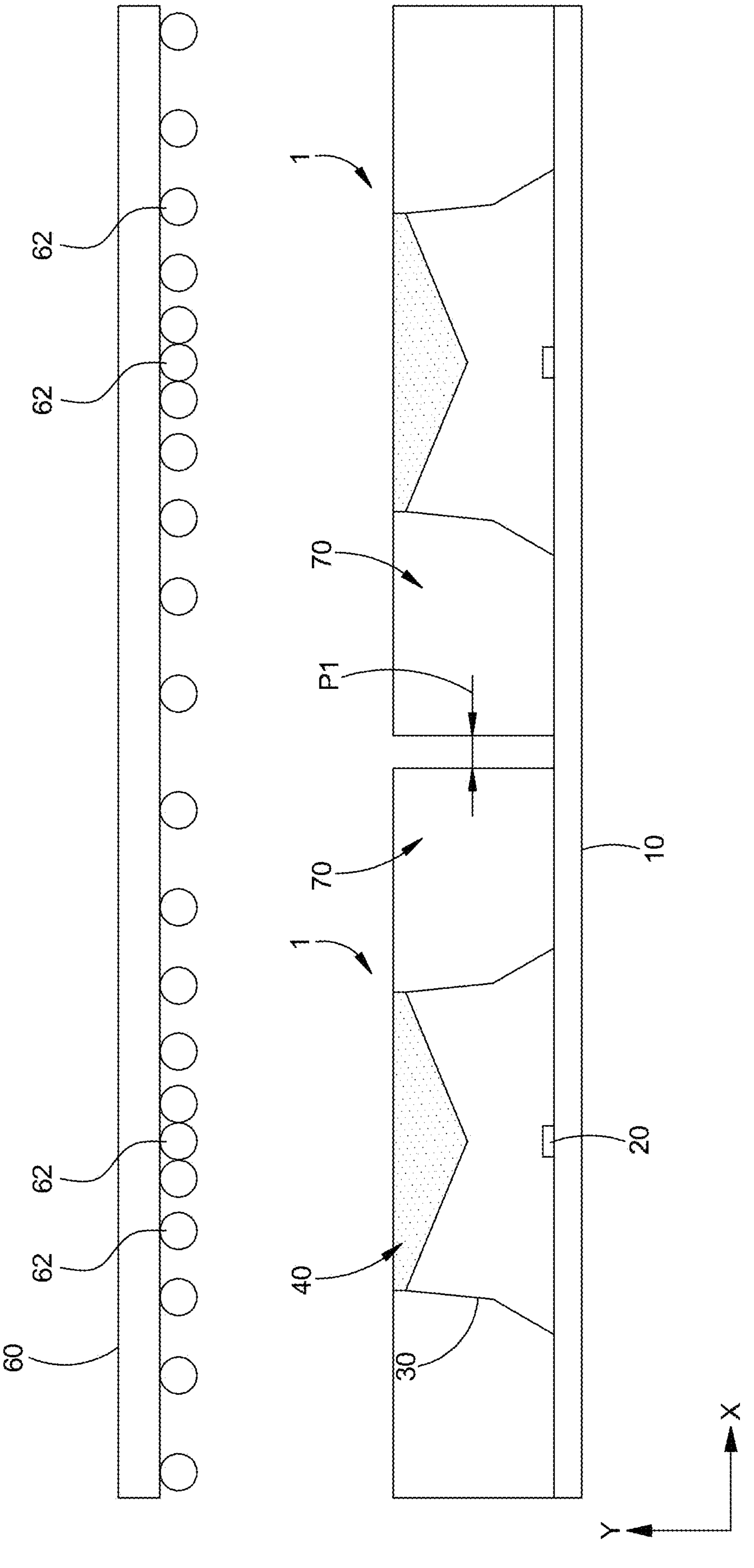

Continued with the above, in the embodiment, the spacing groove P1 is a groove with equal width, as shown in FIG. 16B.

Figure 16C:
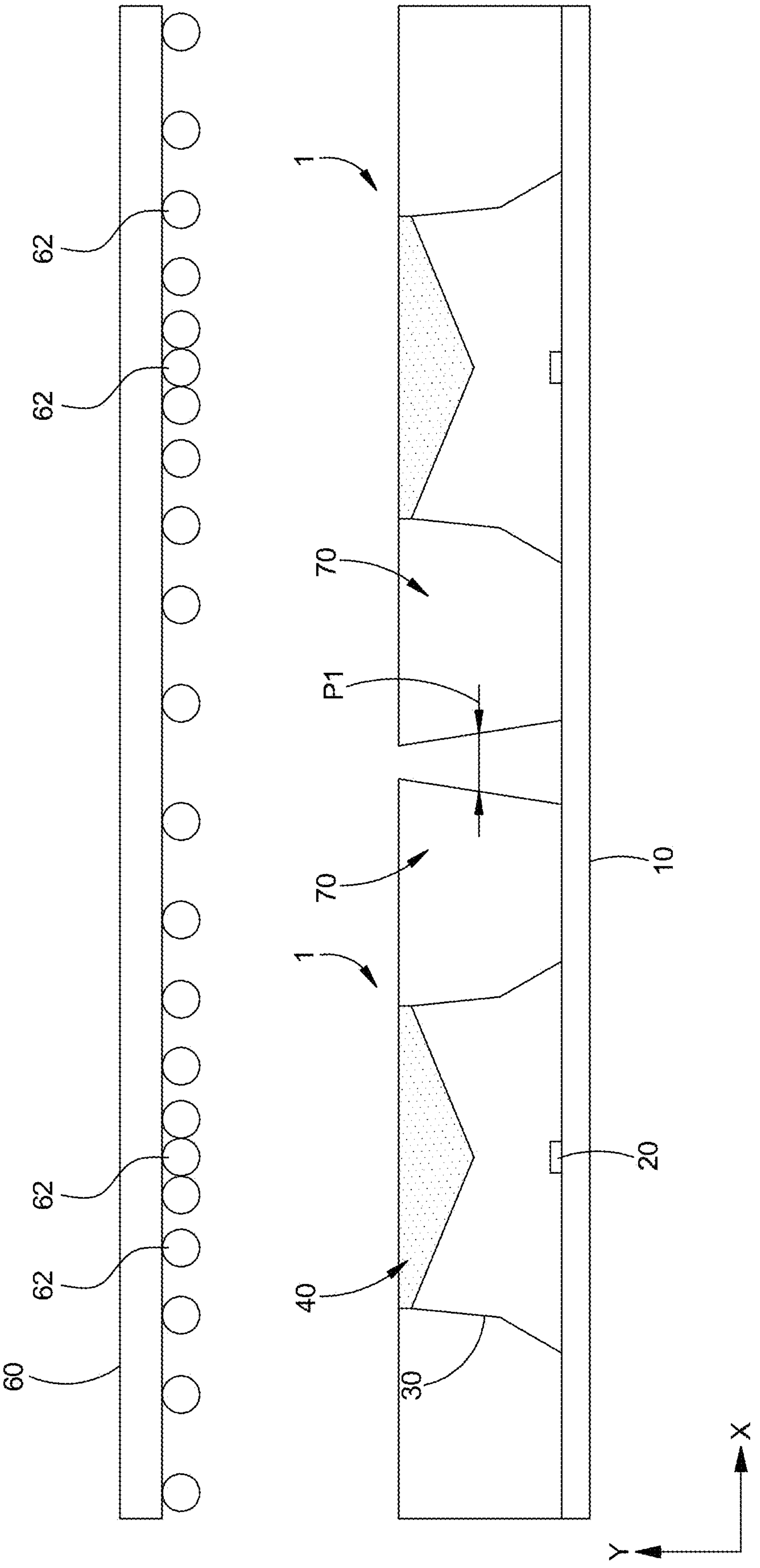

Continued with the above, in the embodiment, the spacing groove P1 is a groove with a narrow upper part and a wide lower part, as shown in FIG. 16C.

Figure 16D:
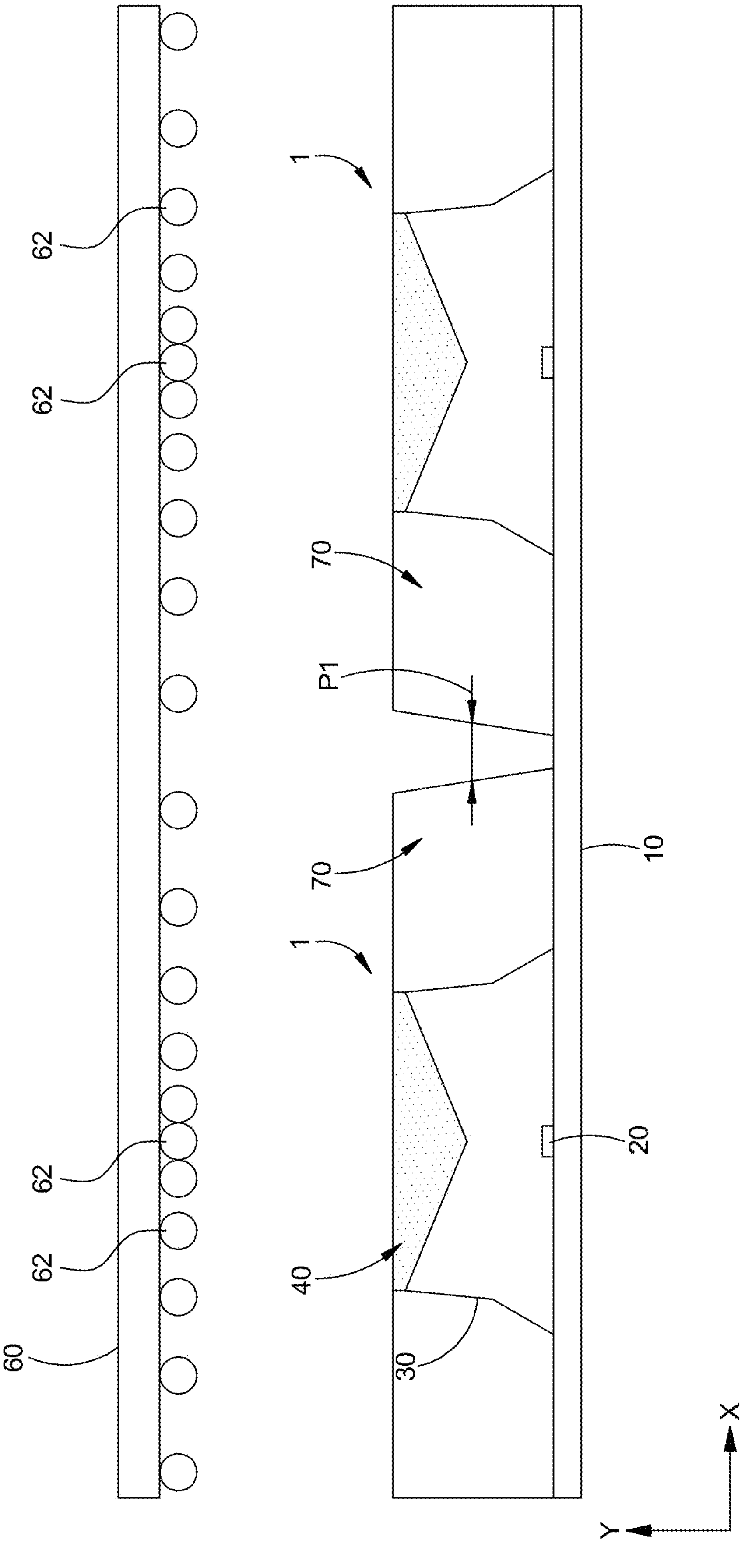
Figure 17A:
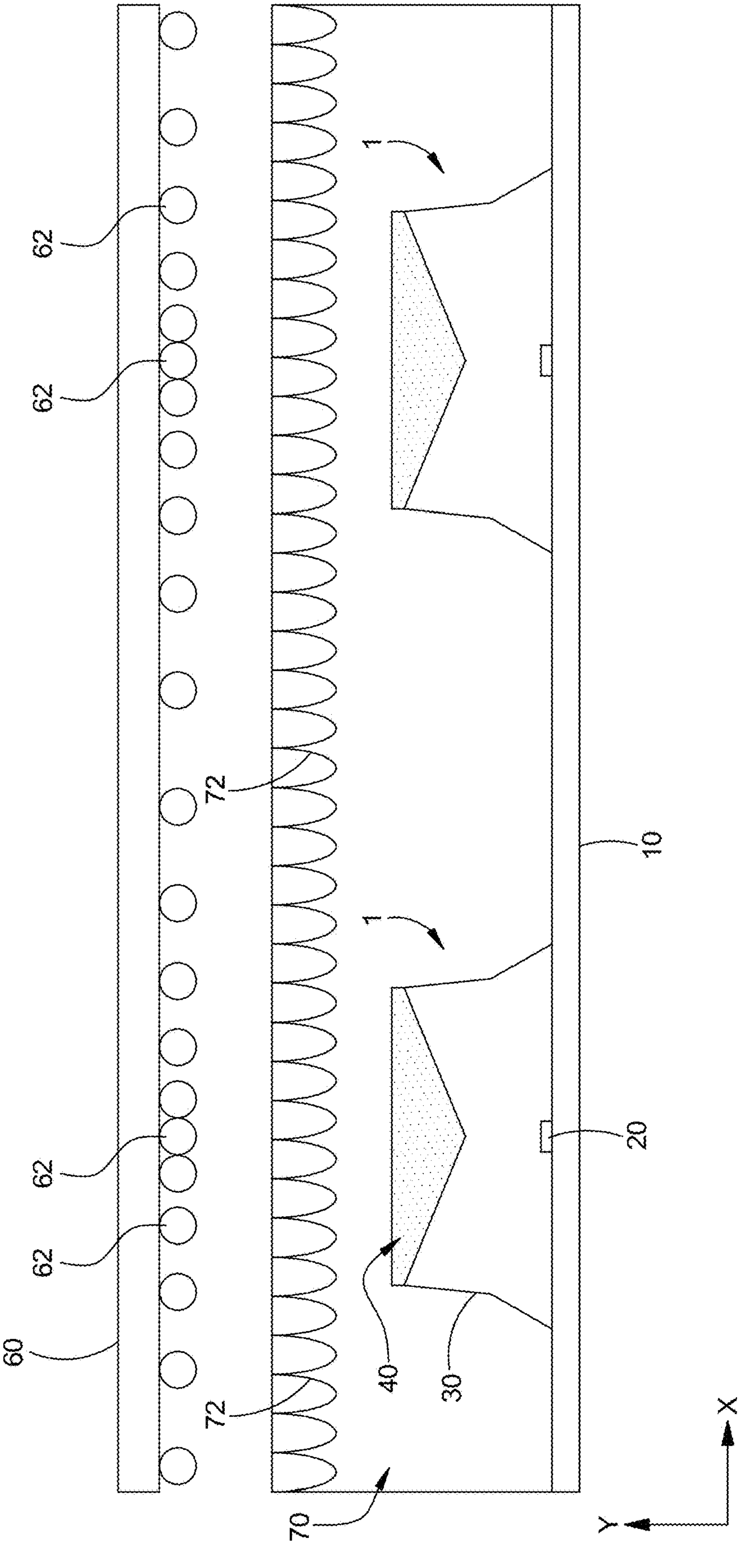
FIGS. 17A to 17B are schematic diagrams of an optical glue according to an embodiment of the present application.
Figure 17B:
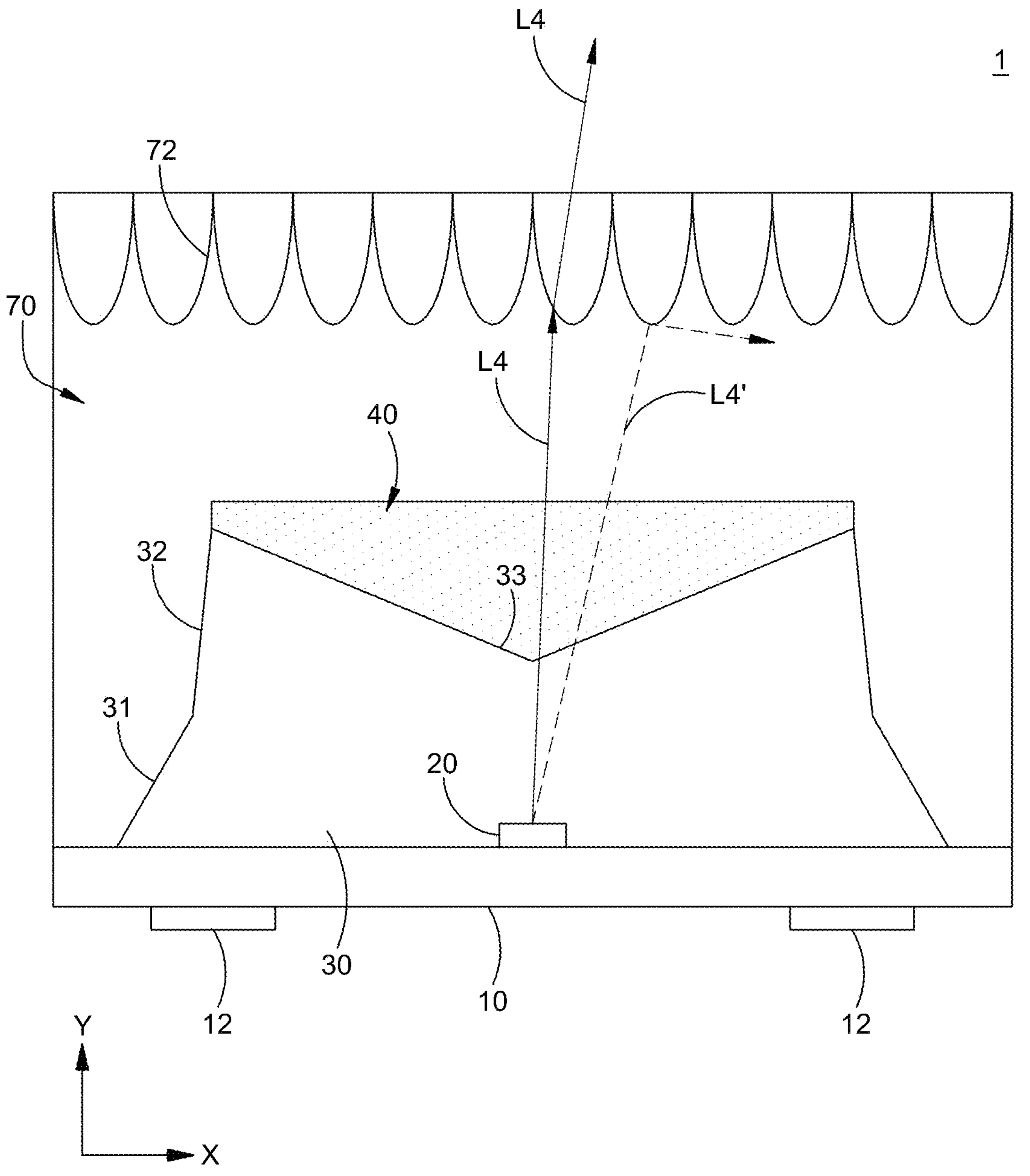

Continued with the above, in the embodiment, the spacing groove P1 is a groove with a wide upper part and a narrow lower part, as shown in FIG. 16D.

Referring to FIGS. 16A-16D, which are schematic diagrams of the optical glue according to an embodiment of the application, in the embodiment, the optical glue 70 extends upward to cover the optical layer 40 and the packaging layer 30, and the upper surface of the optical glue 70 includes a plurality of microstructures 72. The microstructures 72 allow part of the fourth light L4 to pass through and part of the fourth light L4' to be reflected, thereby adjusting the light shape of the fourth light L4' passing through the optical layer 40.

Continued with the above, In the embodiment, the microstructures 72 are recessed portion structures provided on the upper surface of the optical glue 70, that is, the microstructures 72 are formed by recessed portion depression of the upper surface of the optical glue 70.

In summary, the application provides a light-emitting module, which comprising a light-emitting element and a packaging layer disposed on a substrate, a reflective surface with a gradually steeping inclined surface is disposed on the upper surface of the packaging layer, two inclined surfaces with a gradually slowing inclined surface are disposed on the outside of the packaging layer, and an optical layer is used to fill on the upper surface of the packaging layer. The reflective surface and the optical layer are used to adjust the distribution of central light, and the two inclined surfaces are used to adjust the distribution of surrounding light, so that the light-emitting module has an even light distribution, the uniformity of the light source is further improved, and the problem of uneven light distribution caused by more light emitted from the upper part and less light emitted from the periphery of the conventional light-emitting module wafer and the generation of multiple bright and dark areas when the light-emitting module wafer is combined into a light-emitting array is solved.

What is claimed is:

1. A light emitting module, comprising:

a substrate;

a light emitting element, disposed on the substrate;

a packaging layer, disposed on the substrate, the packaging layer covering the light emitting element, the packaging layer including a first inclined surface and a second inclined surface, the first inclined surface surrounding an outer side of the packaging layer, and extending upward to form the second inclined surface, an upper surface of the packaging layer recessed downward corresponding to the light emitting element; and an optical layer, filled on the upper surface of the packaging layer, and a bottom side of the optical layer including at least a first reflective surface extended along the upper surface of the packaging layer;

wherein the first inclined surface has a first angle with an X-axis, the second inclined surface has a second angle with the X-axis, the first angle of the first inclined surface is greater than the second angle of the second inclined surface while the first and second angles are greater than 90 degrees with the X-axis, and the at least one first reflective surface is disposed at a third angle less than 90 degrees with the X-axis.

2. The light emitting module of claim 1, wherein a bottom side of the substrate includes two electrodes, and the two electrodes are electrically connected to the light emitting element.

3. The light emitting module of claim 1, wherein the light emitting element emits a first light, the first light is emitted to the first inclined surface and the second inclined surface, the first inclined surface and the second inclined surface refract the first light respectively, the light emitting element emits a second light, the second light is emitted to the at least one first reflective surface, a part of the second light passes through the at least one first reflective surface, another part of the second light is reflected by the at least one first reflective surface, and the first inclined surface and the second inclined surface refract the another part of the second light respectively.

4. The light emitting module of claim 1, wherein the light emitting element is buried in an inner side of the substrate.

5. The light emitting module of claim 1, wherein the at least one first reflective surface is recessed downward corresponding to the light emitting element to form a recessed portion in a U shape, and a depth of the recessed portion is larger than a width of the recessed portion.

6. The light emitting module of claim 1, wherein the upper side of the substrate includes a reflective layer, including a plurality of reflective structures, which are holes or black and white ink particles respectively.

7. The light emitting module of claim 1, wherein the upper side of the substrate includes a reflective layer, including a plurality of reflective structures, which are holes or black and white ink particles respectively.

8. The light emitting module of claim 1, wherein the packaging layer includes a plurality of the first reflective surfaces, and the first reflective surfaces are disposed adjacent to each other, and the first reflective surfaces respectively recessed downward corresponding to the light emitting element along the upper surface of the packaging layer.

9. The light emitting module of claim 1, wherein two sides of the at least one first reflective surface extend to form at least one second reflective surface and at least one third reflective surface, the third angle of the at least one first reflective surface is larger than a fourth angle of the at least one second reflective surface, and the fourth angle is larger than a fifth angle of the at least one third reflective surface.

10. The light emitting module of claim 9, wherein the packaging layer includes a plurality of the first reflective surfaces, the second reflective surfaces, and the third reflective surfaces, the first reflective surfaces, the second reflective surfaces, and the third reflective surfaces disposed adjacent to each other.

11. The light emitting module of claim 1, further comprising a diffusion sheet, disposed on and spaced from the optical layer, a bottom side of the diffusion sheet including a plurality of diffusion dots, the density of the diffusion dots gradually decreasing from the light emitting element to outward.

12. The light emitting module of claim 11, further comprising an optical glue, covering an outer side of the packaging layer.

13. The light emitting module of claim 12, wherein the optical glue includes a spacing groove corresponding to a region having a lower density of the diffusion dots.

14. The light emitting module of claim 12, wherein the optical glue extends upwardly to cover the optical layer, and the upper surface of the optical glue includes a plurality of microstructures.

* * * * *